Patented Aug. 1, 1933

1,920,373

UNITED STATES PATENT OFFICE 1,920,373

PROCESS OF SYNTHESIZING ORGANIC COMPOUNDS CONTAINING OXYGEN

Henri Albert Gosselin, Montereau, France, assignor to Société Chimique de la Grande Paroisse Azote & Produits Chimiques, Paris, France, a Corporation of France No Drawing. Application January 23, 1931, Serial No. 510,850, and in France February 7, 1930

5 Claims. (Cl. 260—112)

This invention relates to a process of synthesizing organic compounds containing oxygen.

Various catalysts have already been described as capable of bringing about the reaction between carbon monoxide and water, with a view to the production of alipathic organic compounds containing oxygen, such as alcohols, acids, ethers, aldehydes and ketones.

The present invention relates to a new series of such catalysts, which are characterized by the possession of properties of special advantage from the industrial point of view.

It is known, in fact, that in addition to the specific part played by the components, the useful action of a catalyst is largely a function of its physical condition. The best results are obtained by means of catalytic masses containing a very large number of extremely fine pores.

On the other hand, from the industrial point of view, it is desirable that the cohesion and hardness of the grains of catalyst should be as high as possible.

This twofold result is obtained by composing the catalytic masses of substances with a zeolitic structure, that is to say, more or less analogous to the natural zeolites, such as lepidolite, bentonite, and the like, or the artificial zeolites, such as commercial permutit.

It is known that these substances result from the union of salts of strongly alkaline character (alkali silicates, alkali borates and the like) with metallates (or salts of amphoteric metals), with or without addition of neutral, or substantially neutral, salts (metallic chlorides, sulphates, nitrates or acetates for example).

It is known that catalysts for the synthesis of organic compounds containing oxygen, can be prepared by associating at least one element of the series:

1. Potassium, sodium, lithium, vanadium, chromium, molybdenum, manganese, iron, cobalt, nickel, silver, copper, zinc, cadmium, lead, antimony, bismuth, calcium, strontium, barium, with at least one element of the series:

2. Beryllium, magnesium, aluminium, cerium, rare earths, boron, silicon, titanium, zirconium, thorium, uranium, tungsten.

Catalysts of a zeolitic nature can therefore be obtained by employing the above elements and by introducing them into the zeolite in a form suited to their particular chemical properties. In this connection it may be mentioned that the elements boron, silicon, titanium, zirconium, aluminium and beryllium, form strongly alkaline salts, that the elements vanadium, chromium, molybdenum, manganese, zinc, lead, antimony, uranium and tungsten are amphoteric, and finally that the elements potassium, sodium, lithium, manganese, calcium, barium, strontium, cerium, rare earths, iron, cobalt, nickel, cadmium, copper, silver, bismuth, and thorium, form salts which are appreciably neutral.

The introduction of the active catalytic elements may be effected in various ways:

(1) All the necessary elements may be introduced into the catalyst as neutral salts, the remainder of the zeolite being composed of alkaline salts. For example, the first constituent may consist of sodium silicate, potassium silicate, borax and the like, with sodium aluminate, potassium aluminate, or other metallates, as the second constituent, and the mixture of the neutral salts of the catalytic elements as the third constituent.

(2) One or more catalytic elements of acid character may be introduced in the form of metallates, the sodium silicate or borax being retained as first constituent, and the other active elements added in the form of neutral salts.

(3) One or more active elements of acid character may be introduced, in the form of alkaline salts, as the first constituent, and the other active elements in the form of metallates, or neutral salts.

(4) Finally, the active elements of alkaline character may be introduced, in the form of silicates, borates and the like, into the first constituent, and the other active elements in the form of metallates or neutral salts.

In each particular instance, the method of introduction should be chosen which corresponds to the various properties of the constituent elements of the catalyst.

It should be noted, in general, that the introduction of an element into the matrix of the zeolite, or in a non-exchangeable form, increases the stability, but weakens the action of this element.

On the contrary, the elements introduced in the form of neutral salts are the most active, but the most unstable.

This remark, however, does not apply to the case in which the zeolitic catalysts are first put through a preliminary treatment of reduction, dehydration or transformation. In this particular case the chemical constitution of the zeolites often undergoes considerable modification, although its physical structure is retained and all the methods of introduction seem to be approximately equivalent.

The zeolites constituted in this manner can be prepared either by fusion or by precipitation.

When the precipitation has been effected in water, it is advantageous to keep the medium alkaline during the course of the operation, by introducing the metallates, and then the salts, into the solution of the first constituent.

As is known, the zeolites are destroyed by a medium which is acid to litmus. It has been found that their catalytic properties are largely dependent on the final pH value of the precipitation. For example zeolites with a lithium base are entirely inactive if the precipitation ends with a pH=10, and display maximum activity at pH=7.

The cohesion and hardness increase pari passu with the activity.

I have ascertained that the pH at the end of the precipitation of the zeolite is best maintained within the narrow limits of from 6.8 to 8 and even that, in general, it is highly advantageous to terminate the precipitations precisely at pH=7 at 20° C., or at a corresponding pH if the temperature is different.

After filtration and washing, the zeolites should be dried progressively, for example at 100° C. and then gradually heated to the temperature of reduction, treatment or catalysis. These operations should be performed with special precaution, in view of the high activity of these catalysts. For example, when the zeolite contains reducible metallates, direct reduction under pressure will destroy the activity almost completely.

The reduction is advantageously commenced at a low temperature (e. g. 200° C. for copper or manganese zeomites) and ordinary pressure, with a gas containing 5–10% of carbon monoxide diluted in an inert gas. It may then be continued, without inconvenience, under pressure (600–800 atmospheres) and at a higher temperature (300–500° C.).

*Example 1*

10 kg. of potassium permanganate are dissolved in 1200 litres of water, 8 kg. of caustic soda being added, and reduction effected with 7 litres of alcohol in the cold. The resulting manganate is treated with an addition of a solution of 4 kg. of borax, followed by an acetic acid solution of: 5.500 kg. of commercial cerium carbonate, 8 litres of 8° Bé. aluminium acetate, and 1 kg. of malachite, with energetic stirring.

The whole is then adjusted to pH=7, by means of a little (3–4 litres) acetic or formic acid. After centrifuging and washing the mass is dried at 100° C.

The crushed grains are reduced with 10% CO at 200° C., and then with 80% CO at 500 atmospheres, the temperature being raised to about 300–350° C.

A mixture of 3CO and 2H$_2$O is then passed at a space velocity of 5000–10000 (space velocity being the number of volume units of gas at N. T. P. passed per volume unit of catalytic space per hour) over the catalyst and a solution of aliphatic ethers and alcohols is collected in an amount corresponding to a degree of conversion of 40–50%.

*Example 2*

1.200 kg. of borax and 9 kg. of sodium aluminate are dissolved in 800 litres of water, and cooled with ice to 0° C. The following formic acid solution, cooled to the same temperature, is added: precipitated lithium carbonate, 0.555 kg.; dry potassium carbonate, 0.210 kg.; crystallized thorium formate, 2.350 kg.; and 8° Bé. aluminium acetate, 2 litres.

The whole is adjusted to pH=7.5 with a little formic acid, and the mass is then centrifuged, washed and dried at 100° C., no previous reduction being needed. The crushed catalyst is heated to 270–280° C., under a pressure of 900 atmospheres in a current of CO saturated with steam and with a space velocity of 2000–5000. A 20% solution of acetic acid and homologues is obtained, in an amount corresponding to a degree of conversion of 10%.

I claim as my invention:

1. A process for the production of oxygen-containing aliphatic compounds by the action of carbon monoxide on water vapor, in which artificial zeolites, resulting from the union of salts of a strongly alkaline character with metallates, are employed as catalysts.

2. A process for the production of oxygen-containing aliphatic compounds by the action of carbon monoxide on water vapor, in which artificial zeolites, resulting from the union of salts of a strongly alkaline character with metallates with addition of substantially neutral salts, are employed as catalysts.

3. A process for the production of oxygen-containing aliphatic compounds by the action of carbon monoxide on water vapor, in which artificial zeolites, prepared in an alkaline solution brought, at the close of the operation, to a pH value between 8 and 6.8, are employed as catalysts.

4. A process as set forth in claim 3, wherein the alkaline solution is brought to a pH value of 7 at 20° C.

5. A process for the production of oxygen-containing aliphatic compounds by the action of carbon monoxide on water vapor, in which the substances resulting from the reduction in two phases of artificial zeolites containing reducible compounds are employed as catalysts, the first phase of the reduction taking place at about 200° C. under atmospheric pressure and with dilute reducing gas, and the second phase taking place between 300 and 500° C., under superatmospheric pressure and with concentrated reducing gas.

HENRI ALBERT GOSSELIN.